(12) United States Patent
Martin

(10) Patent No.: US 12,248,927 B2
(45) Date of Patent: Mar. 11, 2025

(54) IDENTIFICATION CARD REGISTRATION SYSTEM AND METHODS

(71) Applicant: Kyocera Document Solutions Inc., Osaka (JP)

(72) Inventor: Michael Ong Martin, Pacheco, CA (US)

(73) Assignee: Kyocera Document Solutions Inc., Osaka (JP)

( * ) Notice: Subject to any disclaimer, the term of this patent is extended or adjusted under 35 U.S.C. 154(b) by 455 days.

(21) Appl. No.: 17/848,617

(22) Filed: Jun. 24, 2022

(65) Prior Publication Data
US 2023/0419299 A1 Dec. 28, 2023

(51) Int. Cl.
*G06Q 20/34* (2012.01)
*B32B 38/00* (2006.01)
*G06Q 20/40* (2012.01)
*G06Q 50/26* (2024.01)

(52) U.S. Cl.
CPC ......... *G06Q 20/341* (2013.01); *B32B 38/145* (2013.01); *G06Q 20/40* (2013.01); *G06Q 50/26* (2013.01); *B32B 2425/00* (2013.01)

(58) Field of Classification Search
CPC ...... G06Q 20/341; G06Q 20/40; G06Q 50/26; G06Q 10/10; G06Q 20/346; G06Q 20/354; G06Q 20/34; B32B 38/145; B32B 2425/00; G06F 21/608
See application file for complete search history.

(56) References Cited

U.S. PATENT DOCUMENTS

2008/0178265 A1 7/2008 Tsuchiya et al.
2018/0247048 A1* 8/2018 Sakemi ............... G06F 21/34

FOREIGN PATENT DOCUMENTS

WO   WO-2012031218 A2 * 3/2012 ........... G06Q 20/045

* cited by examiner

*Primary Examiner* — Marisol Figueroa
(74) *Attorney, Agent, or Firm* — Millen, White, Zelano & Branigan P.C.; William F. Nixon

(57) ABSTRACT

An identification card registration system uses a cloud-based server to authenticate and register an identification card from a user. A device captures card data for the identification card and transaction information generated at the device. The card data and transaction information is sent to the cloud-based server as a primary notification for registering the identification card. The cloud-based server sends an alert to an administrator to approve or decline the registration. During the approval process, the identification card subsequently is used at the device or another device. The cloud-based server provides notice that the identification card is awaiting approval and takes corrective action after too many registration attempts are tracked.

20 Claims, 9 Drawing Sheets

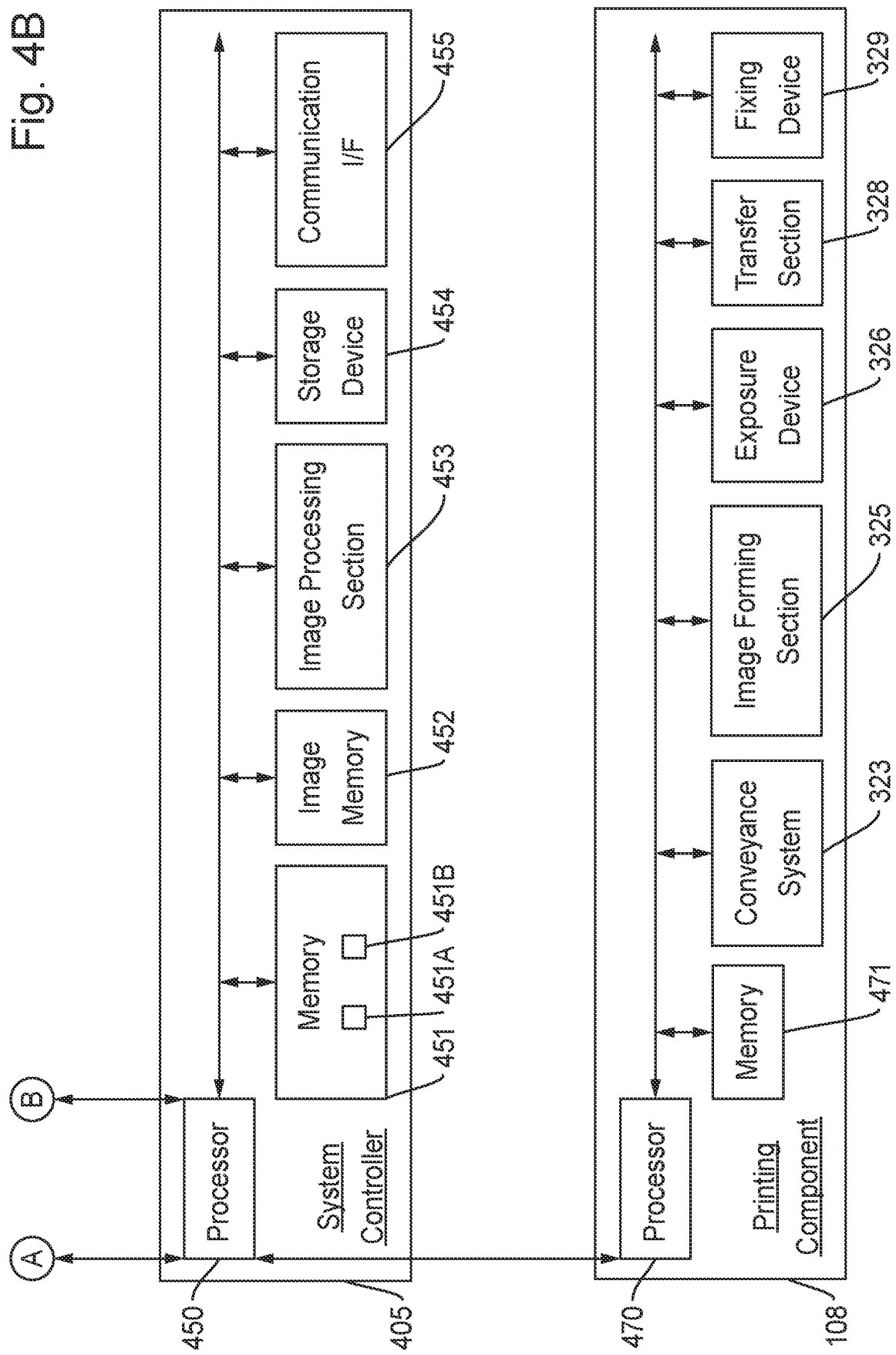

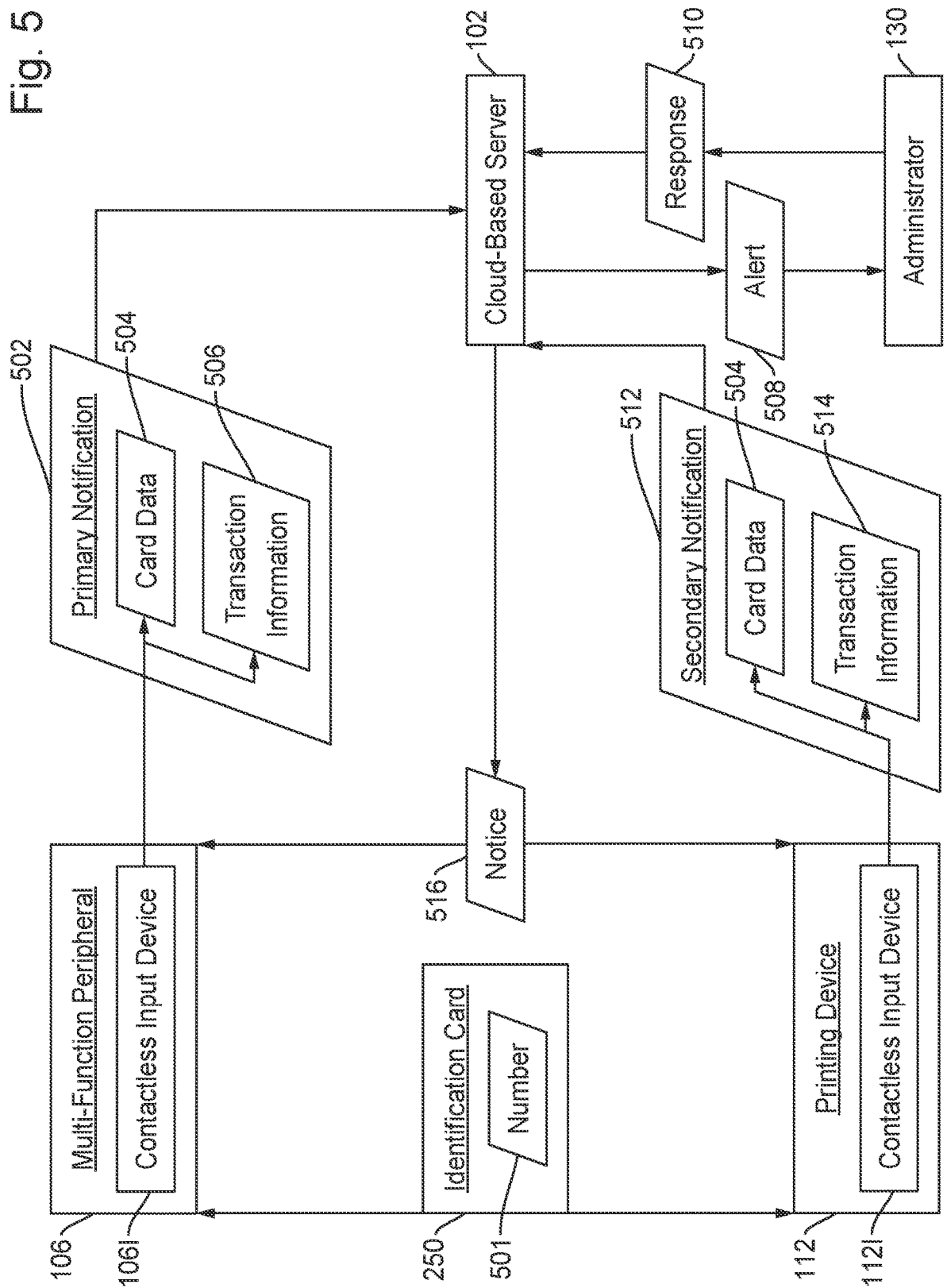

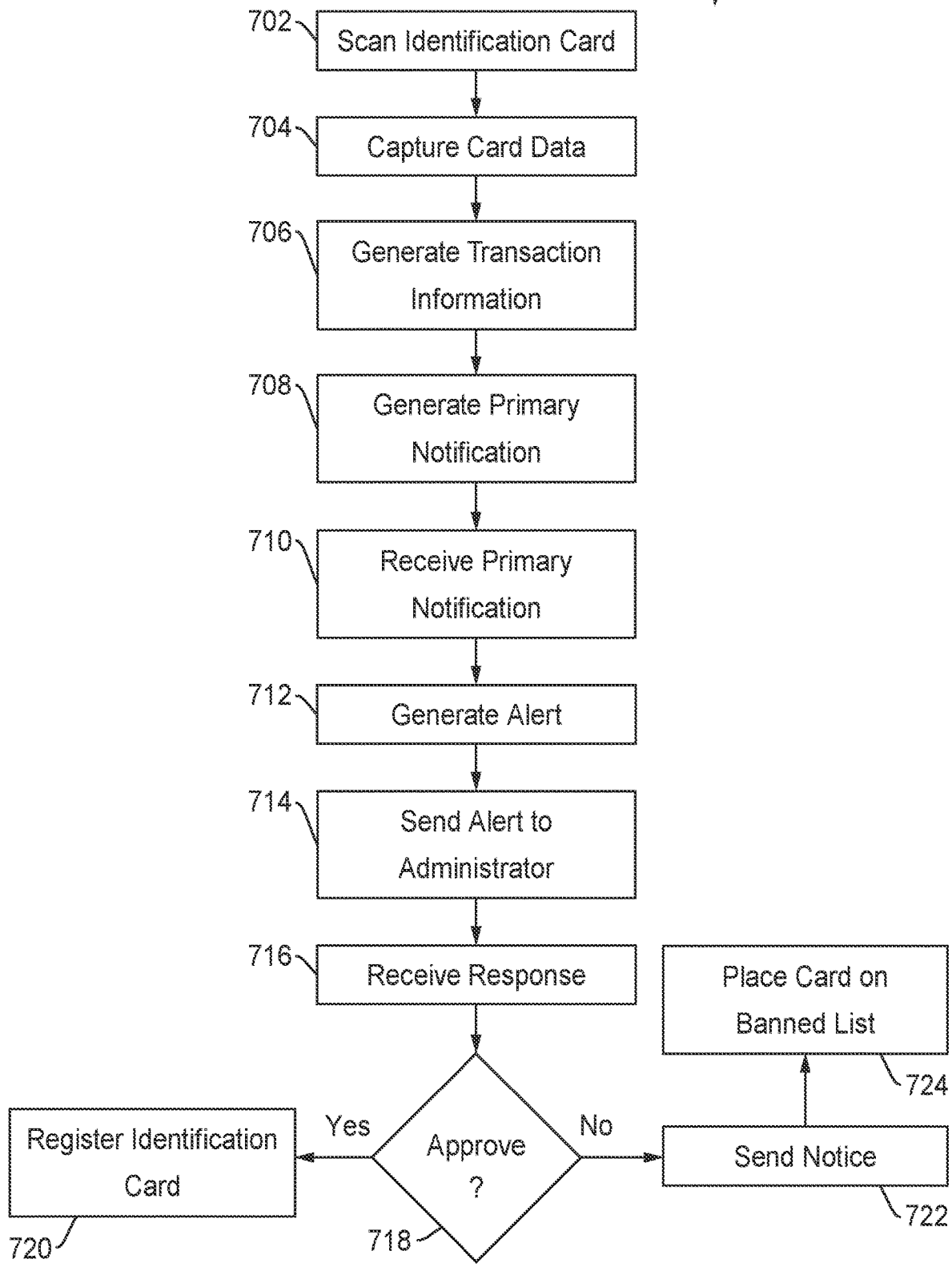

IDENTIFICATION CARD REGISTRATION SYSTEM AND METHODS

FIELD OF THE INVENTION

The present invention relates to registering an identification card in a document management system.

DESCRIPTION OF THE RELATED ART

Identification cards for companies and organizations are commonplace. These companies and organizations have an interest in preventing unauthorized use of such cards to access services and systems. Typically, a user logs onto a device attached to a network for the organization to validate the card.

SUMMARY OF THE INVENTION

A method for remote registration of an identification card for use within a cloud-based network is disclosed. The method includes receiving a notification at a cloud-based server that an identification card reader at a first device received data from an identification card during a first transaction. The identification card is not registered within the network. The method also includes sending an alert to an administrator within the network to register the identification card. The alert includes a means to approve or disapprove registration of the identification card as well as information regarding the first transaction. The method also includes detecting that the data from the identification card is submitted for a second transaction at a second device within the network. The identification card is not registered as approved at the cloud-based server. The method includes generating a notice that the identification card is not registered as approved at the cloud-based server. The method also includes sending the notice to the second device that the second transaction is not allowed.

A method for remote registration of an identification card for use within a cloud-based network is disclosed. The method includes receiving a notification at a cloud-based server that an identification card reader at a device received data from an identification card during a first transaction. The identification card is not registered within a network. The method also includes sending an alert to an administrator within the network to register the identification card. The alert includes a means to approve or disapprove registration of the identification card as well as information regarding the first transaction. The method also includes detecting that the data from the identification card is submitted for a second transaction at the device within the network. The identification card is not registered as approved at the cloud-based server. The method also includes generating a notice that the identification card is not registered as approved at the cloud-based server. The method also includes sending the notice to the device that the second transaction is not allowed.

An identification card registration system is disclosed. The identification card registration system includes a cloud-based server. The identification card registration system also includes a plurality of devices connected to the cloud-based server over a network. Each of the plurality of devices includes an identification card reader. The cloud-based server is configured to receive a notification at the cloud-based server that an identification card reader at a device of the plurality of devices received data from an identification card during a first transaction. The identification card is not registered within the network. The cloud-based server also is configured to send an alert to an administrator within the network to register the identification card. The alert includes a means to approve or disapprove registration of the identification card as well as information regarding the first transaction. The cloud-based server also is configured to detect that the data from the identification card is submitted for a second transaction within the network. The identification card is not registered as approved at the cloud-based server. The cloud-based server also is configured to generate a notice that the identification card is not registered as approved at the cloud-based server. The cloud-based server also is configured to send the notice from the cloud-based server that the second transaction is not allowed.

BRIEF DESCRIPTION OF THE DRAWINGS

Various other features and attendant advantages of the present invention will be more fully appreciated when considered in conjunction with the accompanying drawings.

FIG. 4B further illustrates the block diagram of an example control system for the MFP according to the disclosed embodiments.

FIG. 5 illustrates a block diagram of data flow within the system for registering an identification card according to the disclosed embodiments.

FIG. 7 illustrates a flowchart for remote registration of the identification card according to the disclosed embodiments.

DETAILED DESCRIPTION OF THE PREFERRED EMBODIMENTS

Figure 1:
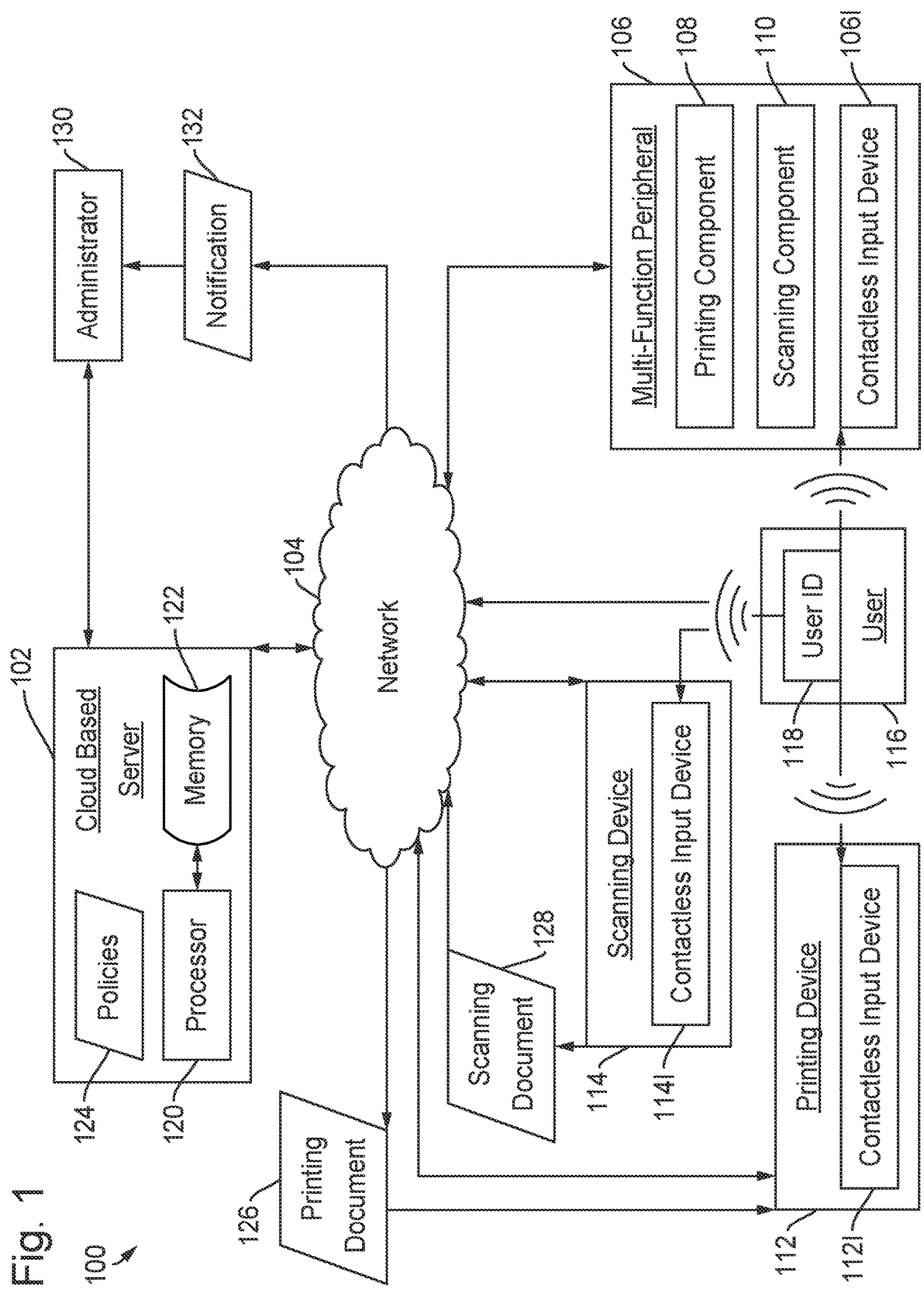
FIG. 1 illustrates a document processing system according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

In many networks, registration of an identification card to a user includes an administrator adding the identification card for a particular user for the organization before the user can use the card to log into the network. The administrator may add the identification card via a card reader or programmatically at a device or a web portal. Alternatively, the user may log onto a device equipped with an identification card reader. The user selections an option to register the identification card. The user may scan the identification card so that the card is now registered for logging into the network.

The disclosed embodiments expand upon this basic process to register identification cards. According to the disclosed embodiments, the user scans the identification card at the identification card reader. The disclosed embodiments detect that the identification card is not registered within the network. For example, the identification card reader may send information from the card to a cloud-based server to determine whether the card is registered. A panel on a device attached to the identification card reader displays a login prompt for the user to log into the device with information about the identification card. If the login is successful, then the identification card is registered to the user.

Alternatively, before the identification card is registered, a notification is sent to the administrator to approve the registration before the identification card may be used to authenticate. The notification may be in the form of an email with a link to approve or ban, a mobile application with a page for listing notifications and a button or buttons to approve or ban, or a short message service (SMS) text with a request to text back data to approve or ban. Notifications would include detailed information of the transaction, such as the user that logged into the device, data or time, location, device information, card number, employee or member number, and the like.

If the user uses the identification card before the card is approved by the administrator, then a notification will show that the card is still pending approval. If the registered-but-unapproved card is used X number of times, then the registration is cancelled. The identification card is placed on a banned card list and cannot be registered until it is surrendered to the administrator for release or to issue a new card. If the login is not successful after X number of attempts, then the identification card is placed on a banned card list so that it cannot be registered until it is surrendered to the administrator.

FIG. 1 depicts a document processing system 100 to register an identification card for access to a cloud-based network 104 according to the disclosed embodiments. Document processing system 100 includes cloud-based server 102, which may manage printing and scanning operations within the system using policies 124. Cloud-based server 102 also includes a processor 120 and a memory 122. Memory 122 may store instructions that, when executed by processor 120, configure cloud-based server 102 to perform certain functions. Cloud-based server 102 also may provide instructions to other components within system 100 as defined by policies 124.

System 100 also may include multi-functional peripheral (MFP) 106. MFP 106 is disclosed in greater detail below by FIGS. 2-4B. MFP 106 may include printing component 108 and scanning component 110. System 100 also includes printing device 112 and scanning device 114. These devices may perform printing operation and scanning operations, respectively, while MFP 106 may be able to perform both types of operations at a single device. Cloud-based server 102 may communicate with MFP 106, printing device 112, and scanning device 114 via network 104.

A user 116 may desire to print a document, scan a document, or both. The disclosed embodiments allows user 116 to do so without touching any component, screen, part, or the like of MFP 106, printing device 112, or scanning device 114. User 116 logs onto a peripheral device using a contactless input device. Once logged on, the peripheral device queries cloud-based server 102 via network 104 with the user identification 118 provided by user 116. Cloud-based server 102 checks an applicable policy of policies 124 for a user profile associated with user identification 118. The policy sets forth actions that may be taken on behalf of user 116 at the applicable device. Thus, user 116 does not touch the device in order to perform printing or scanning operations as the instructions are provided by cloud based server 102 according to the applicable policy.

MFP 106 includes contactless input device 106I. Printing device 112 includes contactless input device 112I. Scanning device 114 includes contactless input device 114I. The contactless input devices may be devices that allow a reader scan a graphic provided on a card or mobile device of user 116. Alternatively, the contactless input devices may be identification card readers that allow user 116 to move a card having a magnetic strip or chip through the reader to provide information. The contactless input devices obtain user identification 118 from the card, graphic, barcode, magnetic strip, chip, and the like without the need for user 116 to input information directly at the applicable device.

The disclosed embodiments may use policies 124 to print or scan documents. For example, user 116 may log onto printing device 112 using contactless input device 112I. Contactless input device 112I reads a QR code from a lanyard card of user 116. User identification 118 is determined from the QR code, which matches user 116. Printing device 112 provides user identification 118 to cloud-based server 102. Cloud-based server 102 looks up the user profile associated with user identification 118. Within user profile is one or more policies 124 that apply to user 116. The policies may be specific to the user or may be specific to a group of users including user 116. In addition, the user profile may list one or more documents for printing, as indicated by user 116. User 116 may select these documents to be printed using a document management service application. The documents are printed according to the instructions provided by the applicable policies 124.

An example user policy may invoke a function to enable print documents upon log on at printing device 112. Upon log on by user 116 to printing device 112, the printing device acquires printing policies 124 from cloud-based server 102. Afterwards, printing device 112 will print each queued job from the user profile at cloud-based server 102 until the end of the last job or a print limit. In other words, there may be a limit on the amount of printing available to user 116 as set forth by one or more policies 124. Thus, cloud-based server 102 may send print document 126 to printing device 112 for printing as instructed by the applicable policy. The user policy also may invoke a function to enable log out after printing the last document. Upon printing the last print job, printing device 112 will log out user 116 automatically. User 116 does not need to enter information or press a button to stop printing.

For an organization or group policy, in addition to the above, this policy may invoke a function to enable print limit overrides upon exceeding a print limit. Upon reaching typical print limits, further printing operations are allowed to continue for specific users or groups. Specific users are allowed to exceed limits despite potentially incurring additional usage costs. These users may be supervisors or users having special jobs to complete. Further, policies 124 may be changed to allow such a function for a specified period of time. The group policy also may enable a function to enable notification 132 to administrator 130 for system 100. Cloud-based server 102 may send notification 132 to organization administrator 130 for support automatically upon reaching the limit. Administrator 130 may override the limit to allow print document 126 to print at printing device 112. This policy may be mutually exclusive with policies allowing a user to exceed the limit.

In other embodiments, user 116 may access scanning device 114. Use of scanning device 114 differs from printing device 112. User 116 logs onto scanning device 114 using contactless input device 1141. Scanning device 114 obtains user identification 118 and forwards it to cloud-based server 102. Cloud-based server 102 associates user identification 118 with the user profile having policies 124. A policy may govern scanning operations for user 116.

For example, a policy may instruct scanning device 114 to determine if any documents are present at the device. One or more documents may be loaded into an automated document feeder (ADF) for scanning device 114. Alternatively, one or more documents, preferably a sheet, are placed on the platen glass for scanning device 114. Scanning device 114 may then be instructed to scan the one or more documents to generate scan document 128. Scan document 128 may be an image file of the document placed at scanning device 114. Thus, the policy may invoke a function to enable scanning of a loaded document upon log on by user 116. Upon user log on, scanning operations will commence if documents are loaded onto the platen glass or the ADF.

The policy also may include additional settings required to complete scans automatically, such as destination settings and scan settings. Destination settings pertain to where scan document 128 is sent after scanning is complete. Destination settings may specify cloud-based server 102 or another location within system 100 to receive scan document 128. For cloud-based server 102, the policy may instruct the server to store scan document 128 with the associated user profile. Alternatively, the policy may instruct scanning device 114 to send scans of "small" documents directly to email for user 116. These features prevent large scan jobs from cluttering the email (and associated email server) account.

Scan settings may specify scanning features, such as grayscale, resolution, and the like. Scanning device 114 implements the scan settings set forth by the policy. In other embodiments, the policy may override scan settings for documents coming from different scanner source, such the ADF as opposed to the platen glass. The policy also may invoke a function to enable log out after scanning operations are complete. When the last document is scanned, scanning device 114 will log out user 116 automatically. This feature allows scanning device 114 to be made available in an efficient manner.

The log out feature for printing device 112 and scanning device 114 may be desirable as user 116 may leave the vicinity of the devices. User 116 does not need to physically press a button to release the device to perform other operations. The policy instructs the device to log out as soon as operations are completed. Thus, the applicable device is returned to system 100 for use.

Policies 124 also include group or organization policies for scanning operations. Such a policy may enable a scan limit override upon exceeding a scan limit. Upon reaching typical scan limits, the disclosed embodiments may allow further scanning to continue for specific users or groups. The allowance of specific users to exceed limits may happen despite potentially incurring additional usage costs. The policy also may invoke a function to enable notification 132 be sent to administrator 130 upon exceeding the scan limit. Notification 132 is sent to administrator 130 for support automatically upon reaching the scan limit. Administrator 130 may take action to allow scanning operations to continue or modify policies 124 to allow the override. This policy may be mutually exclusive with policies allowing the scan limits to be exceeded.

Administrator 130 may set the parameters for policies 124 within an organization. The administrator also may set up the groups of users applicable to policies 124 that deal with organization level issues. Administrator 130 also may set limits for users 116 for printing and scanning Administrator 130 may access cloud-based server 102 remotely to manage policies 124.

It should be noted that MFP 106 includes printing component 108 and scanning component 110. Printing component 108 may operate within document processing system 100 much like printing device 112. Policies 124 set forth functions and limits available at MFP 106 for printing operations. Scanning component 110 may operate much like scanning device 114. Print document 126 may be received at MFP 106 and scan document 128 sent from MFP 106, depending what is being done by user 116. Policies 124 may create a hierarchy of actions to be done at MFP 106 so that operations do not interfere with each other. This feature is disclosed in greater detail below.

Figure 2:
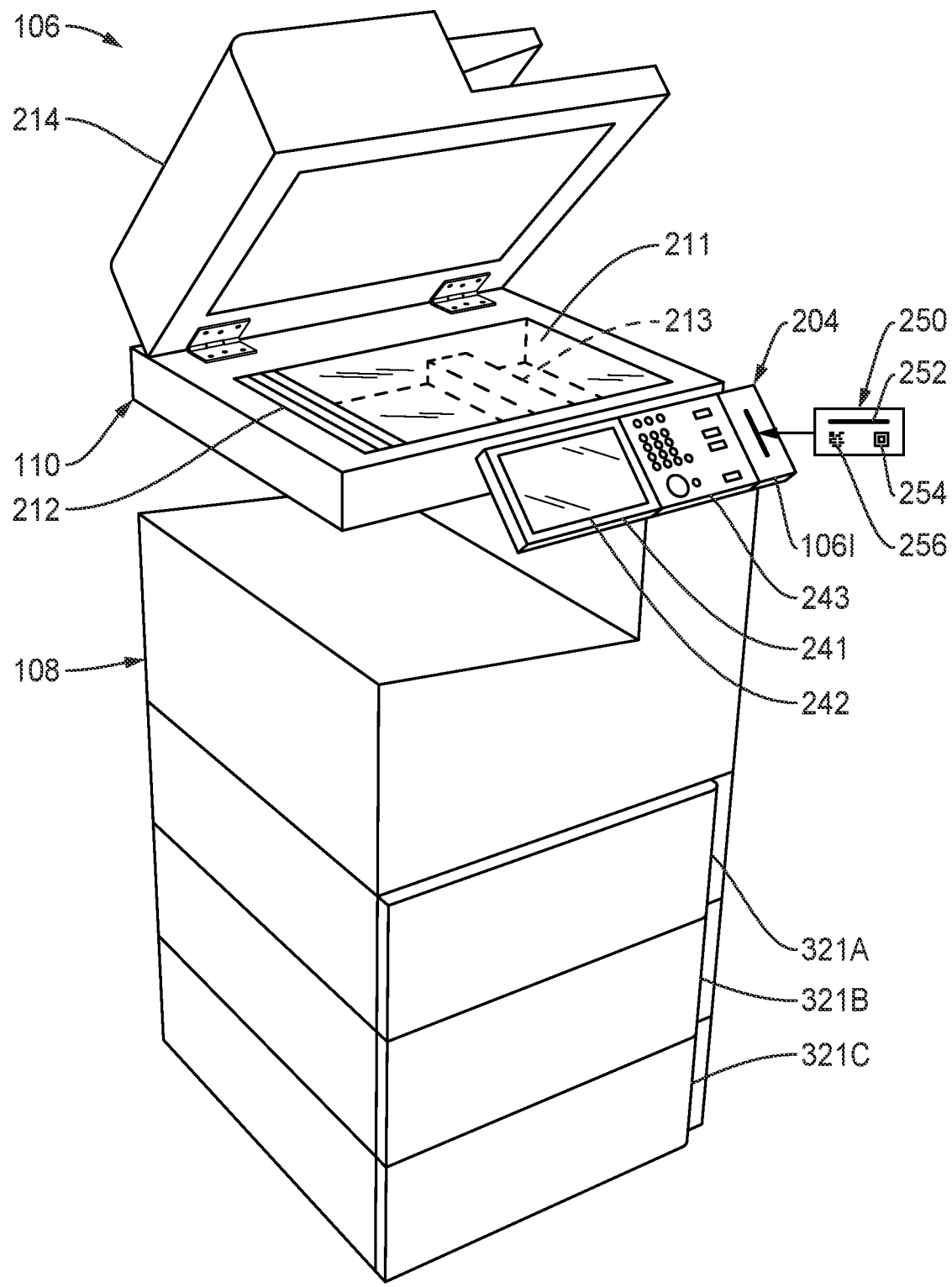
FIG. 2 illustrates a perspective view of a multi-functional peripheral (MFP) as an image forming apparatus according to the disclosed embodiments.
Figure 3:
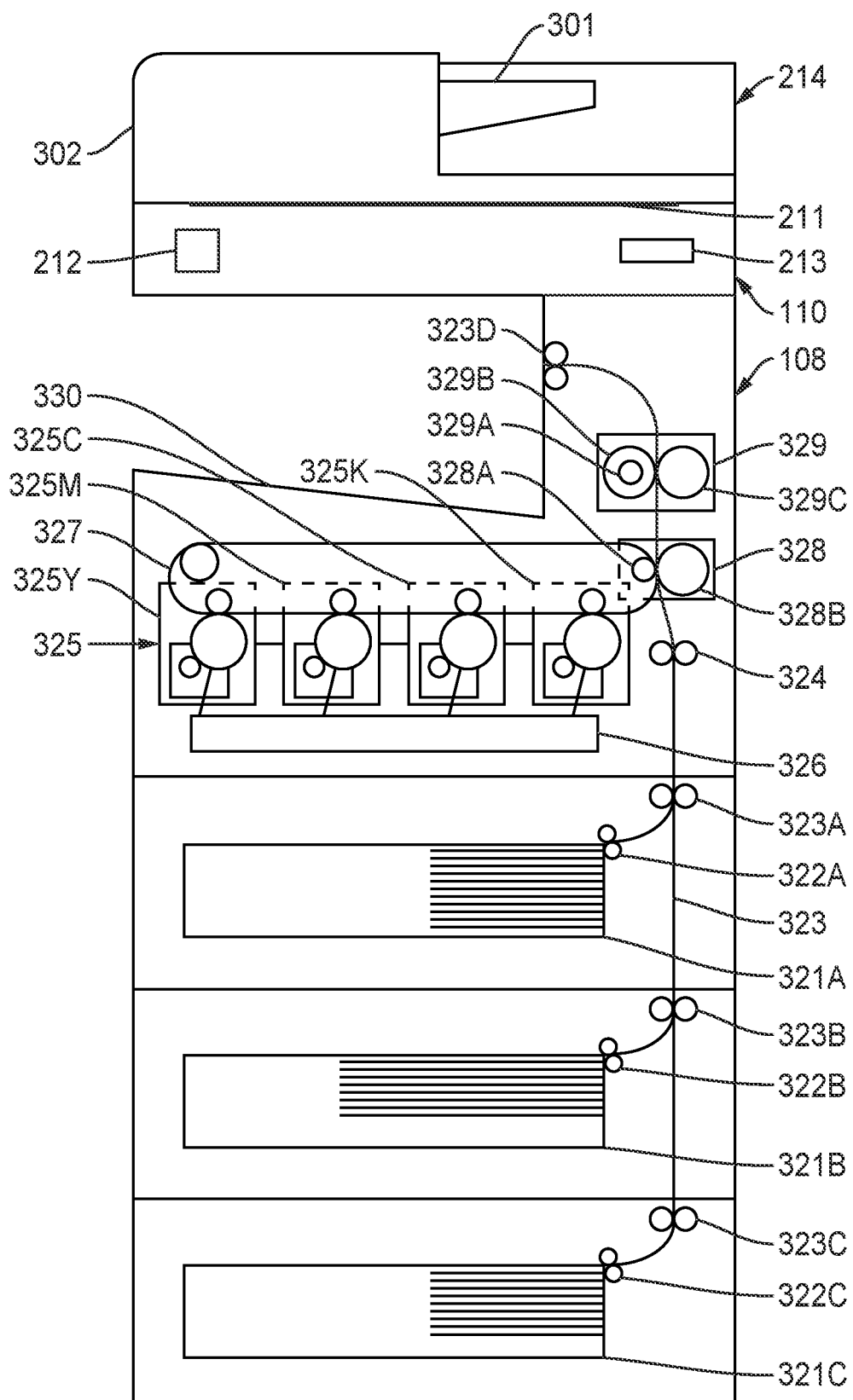
FIG. 3 illustrates a cross-sectional view of the MFP according to the disclosed embodiments.

FIG. 2 depicts a perspective view of MFP 106 as an image forming apparatus according to the disclosed embodiments. FIG. 3 depicts a cross-sectional view of MFP 106 according to the disclosed embodiments. As shown in FIG. 2, MFP 106 includes scanning component 110, printing component 108, and an operation panel 204. Scanning component 110 is provided at an upper part of a main body of MFP 106. Scanning component 110 has a document table, or platen, glass 211 on which a document to be scanned is placed. Scanning component 110 includes an image reading mechanism that scans the document on platen glass 211.

Figure 4A:
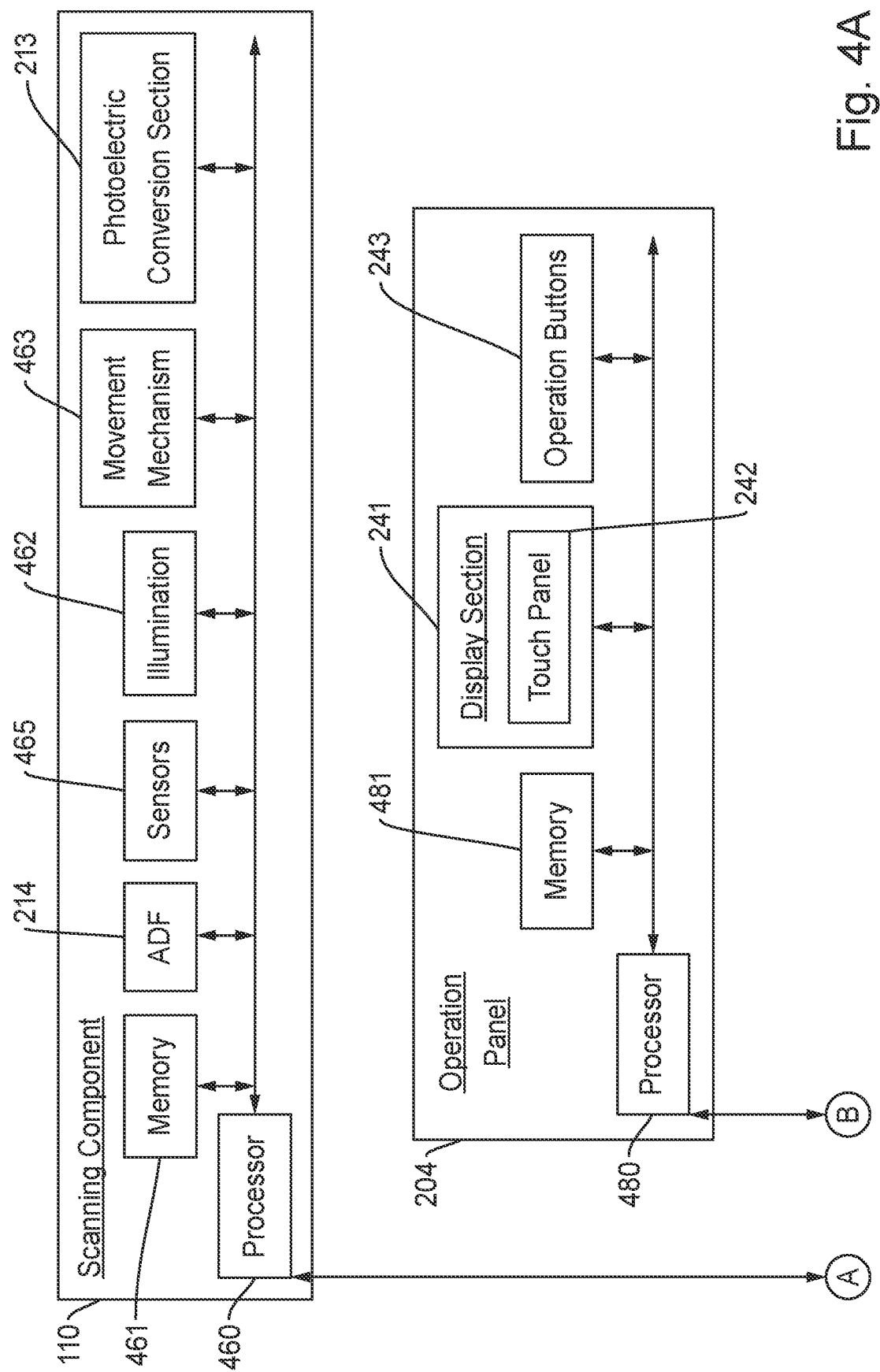
FIG. 4A illustrates a block diagram of an example control system for the MFP according to the disclosed embodiments.

Scanning component 110 also includes a carriage 212 and a photoelectric conversion section 213. Carriage 212 and photoelectric conversion section 213 are provided below platen glass 211. Carriage 212 includes an illumination 462, as shown in FIGS. 4A and 4B, and an optical system such as a mirror. Illumination 462 is provided in carriage 212 to irradiate a reading position on platen glass 211 with light. The reading position on platen glass 211 irradiated by illumination 462 with the light is an image corresponding to one line, or a plurality of lines, in a main scanning direction. The optical system such as a mirror provided in carriage 212 guides a light, or reflected light, from the reading position irradiated by illumination 462 to photoelectric conversion section 213.

Carriage 212 is moved in a sub-scanning direction below platen glass 211 by a movement mechanism 463, as shown in FIGS. 4A and 4B, including a stepping motor or the like. A position of carriage 212 is determined in an initial operation, and the movement thereof in the sub-scanning direction is controlled based on the determined position. For example, carriage 212 is moved in the sub-scanning direction to continuously guide an image of each line in the main scanning direction in a document reading area on platen glass 211 wherein the document is placed to photoelectric conversion section 213.

Photoelectric conversion section 213 includes a lens, a photoelectric conversion sensor, and a cover. The lens condenses the light guided by the optical system of carriage 212 to guide the light to the photoelectric conversion sensor. The photoelectric conversion sensor includes photoelectric conversion elements. The photoelectric conversion sensor, for example, may be a line sensor in which charge coupled devices (CCDs) or contact image sensors (CISs) as photoelectric conversion elements are arranged in a line. The line sensor as the photoelectric conversion sensor converts the image corresponding to one line in the main scanning direction, reflected light by a document surface, into pixel data corresponding to one line.

Carriage 212 includes an exposure lamp and the optical system, such as a mirror, and is moved below platen glass 211 in the sub-scanning direction. Carriage 212 moves the reading position on platen glass 211 leading to photoelectric conversion section 213 in the sub-scanning direction. Specifically, scanning component 110 adjusts the reading of the image in the sub-scanning direction by controlling the movement of carriage 212. Scanning component 110 reads the image of the entire document be acquiring the image data in the main scanning direction converted by photoelectric conversion section 213 while moving carriage 212 in the sub-scanning direction.

Scanning component 110 also includes ADF 214. ADF 214 also functions as a document table cover and is provided in an openable manner. When ADF 214 is closed, it covers the entire document reading area on platen glass 211. ADF 214 includes a sheet feed tray 301 and a conveyance system 302, as illustrated in FIG. 3. Sheet feed tray 301 of ADF 214 holds a document of sheets to be read. Conveyance system 302 of ADF 214 picks up the sheets of the document set in sheet feed tray 301 one by one to convey them so that a reading surface of each sheet taken out passes through a predetermined reading position. Using this process, scanning component 110 may generate scan document 128.

As illustrated in FIG. 3, printing component 108 includes sheet feed cassettes 321A, 321B, and 321C. Additional feed cassettes may be loaded onto MFP 106. Each of sheet feed cassettes 321A, 321B, and 321C accommodates a sheet as an image forming medium on which an image is to be printed. For example, each of sheet feed cassettes 321A, 321B, and 321C is detachable from the lower part of MFP 106. Sheet feed cassettes 321A, 321B, and 321C have sheet feed rollers 322A, 322B, and 322C, respectively. Sheet feed rollers 322A, 322B, and 322C pick up sheets one by one from sheet feed cassettes 321A, 321B, and 321C, respectively.

Conveyance system 323 conveys a sheet in printing component 108. Conveyance system 323 includes a plurality of conveyance rollers 323a, 323b, 323c, and 323d as well as a registration roller 324. Conveyance system 323 conveys the sheet taken from sheet feed rollers 322A, 322B, or 322C to registration roller 324. Registration roller 324 conveys the sheet to a transfer position in accordance with a timing at which an image is transferred.

An image forming section 325 includes a plurality of image forming sub-sections 325Y, 325M, 325C, and 325K to form images of respective colors (yellow, magenta, cyan, and black). An exposure device 326 forms an electrostatic latent image as an image to be developed in each color on each image carrier in each of image forming sub-sections 325Y, 325M, 325C, and 325K. Exposure device 326 forms the electrostatic latent image on the image carrier by exposing the image carrier with the light emitted in response to the image data. For example, exposure device 326 exposes a photoconductive drum as the image carrier in the main scanning direction by irradiating the photoconductive drum via a rotating polygon mirror with the light emitted by a light emitting section. The irradiation position of the light from exposure device 326 moves in the sub-scanning direction as the photoconductive drum rotates. Specifically, a position and magnification of an image formed by image forming section 325 are adjusted by controlling exposure device 326.

Image forming sub-sections 325Y, 325M, 325C, and 325K develop electrostatic latent images on the respective image carriers with toners of respective colors (yellow, magenta, cyan, and black). Intermediate transfer belt 327 is an intermediate transfer member. Image forming sub-sections 325Y, 325M, 325C, and 325K transfer toner or ink images for respective colors developed with the toners or inks of respective colors on respective image carriers onto intermediate transfer belt 327, or the primary transfer.

Intermediate transfer belt 327 conveys the transferred toner or ink image to a secondary transfer position while holding the toner or ink image. The secondary transfer position is a position where the toner or ink image on intermediate transfer belt 327 is transferred onto a sheet. At the secondary transfer position, a support roller 328a and secondary roller 328b face each other. Support roller 328a and secondary transfer roller 328b constitute a transfer section 328. Registration roller 324 conveys the sheet to the secondary transfer position in accordance with a timing at which the toner or ink image on intermediate transfer belt 327 is transferred. Transfer section 328 transfers the toner or ink image held on intermediate transfer belt 327 onto the sheet at the secondary transfer position.

For example, in the case of forming a color image, image forming sections 325Y, 325M, 325C, and 325K transfer toner or ink images developed with toners or inks of respective colors (yellow, magenta, cyan, and black) onto intermediate transfer belt 327 by overlapping the toner or ink images on the intermediate transfer belt. Intermediate transfer belt 327 holds a color image obtained by overlapping the toner or ink images for respective colors. Transfer section 328 transfers the color image formed with the toners or inks of plural colors on intermediate transfer belt 327 onto the sheet at the secondary transfer position. Registration roller 324 conveys the sheet to the second transfer position in according with a timing at which the toner or ink image on intermediate transfer belt 327 is transferred. As a result, the color image is transferred onto the sheet.

Transfer section 328 supplies the sheet onto which the toner or ink image is transferred to a fixing device 329. Fixing device 329 fixes the toner or ink image on the sheet. Fixing device 329 has a heating section 329a, a heat roller 329b, and a pressure roller 329c. Heating section 329a heats heat roller 329b. Heat roller 329b and pressure roller 329c perform a fixing processing of heating and pressurizing the sheet onto which the toner or ink image is transferred by transfer section 328. Heat roller 329b and pressure roller 329c of fixing device 329 transmit the sheet on which the fixing processing is performed to conveyance roller 323d. Conveyance roller 323d conveys the sheet from fixing device 329 to a sheet discharge section 330.

As illustrated in FIG. 2, operation panel 204 is a user interface. Operation panel 204 displays guidance and receives an input of an operation button or icon. For example, a user inputs setting information with operation panel 204. Operation panel 204 includes a display section, or display, 241, a touch panel 242, and a plurality of operation buttons 243. For example, touch panel 242 is provided on a display screen of display section 241. Touch panel 242 detects a portion touched by user 116 on the display screen of display section 241.

The disclosed embodiments may avoid the actions taken with regards to operations panel 204 by using contactless input device 1061. Instead of pushing buttons 243 or touching touch panel 242, the disclosed embodiments may obtain user identification 118 using contactless input device 1061. For example, a card 250 may be provided by user 116. Alternatively, card 250 may be a card attached to a lanyard normally carried by employees or people within an organization or location. Card 250 may be placed into contactless input device 1061 to provide information on user 116. Such information may be a user name 252, as shown on card 250. Contactless input device 1061 may associate user name 252 with user identification 118. Information associated with user 116 may be read by contactless input device 1061 from embedded chip 254 within card 250. It also may be read from graphical code 256. Graphical code 256 may be scanned by input device 1061 and may include a barcode, a QR code, and the like. In this way, user identification 118 is provided to MFP 106 without the need to make contact with any component, buttons, or screen thereon.

FIGS. 4A and 4B depict a block diagram of an example control system for MFP 106 according to the disclosed embodiments. MFP 106 includes a system controller 405 that may control printing component 108, scanning component 110, and other components on the MFP. System controller 405 is connected to scanning component 110, printing component 108, and operation panel 204. As shown in FIGS. 4A and 4B, system controller 405 includes a processor 450, a memory 451, an image memory 452, an image processing section 453, a storage device 454, and a communication interface (UF) 455.

Processor 450 is connected to processor 460 of scanning component 110, processor 470 of printing component 108, and processor 480 of operation panel 204 via applicable interfaces. Processor 450 may perform various processing functions by executing programs stored in memory 451 or storage device 454. For example, by executing a program stored in memory 451, processor 450 output an operation instruction to each section and processes various kinds of information from each section.

Memory 451 includes memories such as a random access memory (RAM), a read only memory (ROM), a non-volatile memory (NVM), and the like. The RAM functions as a working memory or a buffer memory. The ROM is a non-rewritable nonvolatile memory. The ROM functions at a program memory. The NVM is a rewriteable nonvolatile memory. The NVM stores setting data for scanning component 110 and printing component 108, and the like.

Memory 451 may include storage area 451a and storage area 451b. Storage area 451a and storage area 451b are rewritable nonvolatile memory areas. Storage area 451a stores information indicating a size of a sheet used for image adjustment in which a below-disclosed setting value to be stored is obtained. Storage area 451b stores sheet information used for correcting the setting value for the image adjustment.

Image memory 452 stores the image data. For example, image memory 452 functions as a page memory for copying or decompressing the image data to be processed. Image processing section 453 processes the image data. To output the processed image data, image processing section 453 performs image processing such as correction, compression, or decompression on the input image data to output the processed image data.

Storage device 454 stores control data, control programs, and data such as setting information. Storage device 454 is a rewritable nonvolatile memory. For example, storage device 454 may be a hard disk drive (HDD) or a solid state drive (SSD).

Communication I/F 455 is used for establishing data communication with an external device. For example, communication I/F 455 functions as an image acquisition section that acquires an image to be printed on the sheet from an external device such as a personal computer (PC). Communication I/F 455 also functions as an interface for communicating with a server, such as cloud based server 102.

An example of a configuration of a control system in scanning component 110 may be disclosed below. Scanning component 110 includes processor 460, memory 461, ADF 214, illumination 462, movement mechanism 463, and photoelectric conversion section 213. Processor 460 performs various kinds of processing by executing programs stored in memory 461. For example, by executing a program, processor 460 controls the operation of each section of scanning component 110, and monitors an operation state of each section. Processor 460 is connected to processor 450 of system controller 405. Processor 460 executes scanning processing in response to an operation instruction from system controller 405.

Memory 461 includes a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

ADF 214 has a pickup roller and a conveyance system 302 as a configuration of a control system. Processor 460 drives the pickup roller and conveyance system 302 to convey the documents one by one to the reading position. ADF 214 also may include sensors 465 located on sheet feed tray 301 to detect the presence of a document or sheets. Sensors 465 also may be located on or adjacent platen glass 211 to detect when a document or sheet is placed thereon. Sensors 465 may alert scanning component 110 that documents need to be scanned.

Illumination 462 is provided in carriage 212 to irradiate the reading position on platen glass 211 with light. Illumination 462 has a light source that emits light in response to a lighting instruction from processor 460. The light source is not limited to having a specific configuration. The light emitted by illumination 462 is reflected by the document placed on platen glass 211 and then enters photoelectric conversion section 213 via the optical system such as a mirror, a lens, and the like.

Movement mechanism 463 moves carriage 212. Movement mechanism 463 includes a stepping motor as a driving source and moves carriage 212 according to the driving of the stepping motor. Movement mechanism 463 moves carriage 212 in response to operation instructions from processor 460 or processor 450 of system controller 405. For example, at the time of scanning the document on platen glass 211, processor 460 moves carriage 212 from a reading start position in the sub-scanning direction (FWD direction).

Photoelectric conversion section 213 includes a photoelectric conversion sensor including photoelectric conversion elements for converting incident light into an electrical signal. Photoelectric conversion section 213 includes, for example, a photoelectric conversion sensor, which is a line sensor for generating pixel data corresponding to one line read in the main scanning direction. Photoelectric conversion section 213 also has a lens for inputting the light guided by the optical system provided in carriage 212 to the photoelectric conversion sensor. Specifically, the photoelectric conversion section 213 sequentially outputs the pixel data corresponding to each line read in the main scanning direction as carriage 212 moves in the sub-scanning direction.

An example of a configuration of a control system for printing component 108 is disclosed. Printing component 108 includes processor 470, memory 471, conveyance system 323, image forming section 325, exposure device 326, transfer section 328, and fixing device 329. Processor 470 performs various kinds of processing by executing programs stored in memory 471. For example, by executing a program, processor 470 controls the operation of each section of printing component 108 and monitors an operation state of each section. Processor 470 is connected to processor 450 of system controller 405 via the interface. Processor 470 executes a printing processing in response to an operation instruction from system controller 405.

Memory 471 includes memories such as a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

Conveyance system 323 conveys the sheet in printing component 108 under the control of processor 470. Specifically, conveyance system 323 drives conveyance rollers of the respective sections in response to an operation instruction from processor 470 to convey the sheet.

In response to the operation instruction from processor 470, exposure device 326 emits light, such as a laser light, for forming an electrostatic latent image on the photoconductive drum of each image forming section 325. Processor 470 adjusts a printing position and a magnification by controlling the irradiation position of the laser light on the photoconductive drum by exposure device 326. Processor 470 executes image adjustment such that a printing area becomes a desired printing area by performing operation control according to a printing area starting from a printing reference.

Image forming section 325 develops the electrostatic latent images formed on the photoconductive drums with toners or inks of respective colors in response to operation instructions from processor 470. Image forming section 325 transfers the toner or ink image formed on the photoconductive drum onto intermediate transfer belt 327, or the primary transfer. Transfer section 328 transfers the toner or ink image transferred onto intermediate transfer belt 327 onto the sheet, or the secondary transfer, in response to an operation instruction from processor 470.

Fixing device 329 drives heat roller 329b and pressure roller 329c in response to an operation instruction from processor 470. Heating section 329a of fixing device 329 heats the surface temperature of heat roller 329b to a desired fixing temperature under the control of processor 470. In a state in which fixing device 329 is controlled at the fixing temperature, fixing device 329 fixes the toner or ink image transferred onto the sheet.

An example of configuration of a control system for operation panel 204 is disclosed. Operation panel 204 includes a processor 480, memory 481, display section 241, touch panel 242, and operation buttons 243. Processor 480 performs various kinds of processing by executing programs stored in memory 481. For example, processor 480 executes a program to control the operation of each section of operation panel 204 and to monitor an operation state of each section. Processor 480 is connected to processor 450 of system controller 405. For example, processor 480 provides system controller 405 with information input by user 116, or read by contactless input device 1061.

Memory 481 includes memories such as a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

Display contents of display section 241 are controlled in response to an operation instructions from processor 480. Touch panel 242 is provided on the display screen of display section 241 to detect a touched position on the display screen. For example, processor 480 displays an operation guidance and icons capable of being selected with touch panel 242 on the display screen of display section 241. Processor 480 determines information input by user 116 according to the touched position detected by touch panel 242. Operation buttons 243 include hard keys such as a start key, a reset key, and the like.

According to the disclosed embodiments, printing component 108 and scanning component 110 may be operated without the need to use touch panel 242 or buttons 243. Instead, operations may be implemented by processors 460, 450, and 470 by policies 124 at cloud based server 102. In other words, the instructions implemented by the processors are fed to the various components from cloud based server 102 and does not require the need for user 116 to input any information or take any action beyond logging onto MFP 106.

It should be noted that the features disclosed for printing component 108 also are applicable for printing device 112. Printing device 112 may include components as disclosed in FIGS. 3 and 4 pertaining to printing component 108 including operation panel 204 and system controller 405. Further, the features disclosed for scanning component 110 also are applicable for scanning device 114. Scanning device 114 may include components as disclosed in FIGS. 3 and 4 pertaining to scanning component 110 including operation panel 204 and system controller 405.

FIG. 5 further depicts a block diagram of data flow within system 100 for registering identification card 250 according to the disclosed embodiments. Identification card 250 may be a new card issued to a user for accessing network 104 and the devices connected thereto. Further, use of identification card 250 may allow access to documents and accounts on cloud-based server 102. The user may print, scan, and manage documents using the connected devices in conjunction with cloud-based server 102. The user, however, needs to be authenticated to use identification card 250.

The user may scan identification card 250 at MFP 106 using contactless input device 1061. Contactless input device 1061 also may be known as an identification card reader. The scan of identification card 250 at MFP 106 may be the first time it has ever been used. Contactless input device 1061 captures card data 504. Card data 504 includes a card number 501 to uniquely identify identification card 250. For example, card data 504 may be provided from embedded chip 254 or graphical code 256 read using contactless input device 1061. Card data 504 may include user name 252 as well other identification information about the user, such as an employee number, title, position, security clearance, and the like.

Once scanned, MFP 106 determines whether identification card 250 is registered within system 100. MFP 106 may query cloud-based server 102 to determine if identification card 250 is registered using card data 504. Alternatively, MFP 106 may include a list of registered identification cards against which to compare new cards. The disclosed embodiments, using cloud-based server 102 or MFP 106, determine that identification card 250 is not registered within system 100. If identification card 250 is registered, then MFP 106 allows the user to access network 104 and manage documents accordingly.

If identification card 250 is not registered, then display section 241 of MFP 106 shows a log in prompt for the user to log in using information from the user to authorize the identification card, such as a user name and password. The user may enter this information using touch panel 242 or operation buttons 243. MFP 106 may coordinate with cloud-based server 102 to register identification card 250. If the log in is successful, then identification card 250 is registered to the user and authorized for use on network 104.

Alternatively, the disclosed embodiments may take additional actions to authorize identification card 250 in order to prevent unauthorized use within system 100. For example, one may obtain the information needed to register identification card 250 despite not being the authorized user of the card. An unauthorized person may obtain the information needed to register identification card 250 using the process disclosed above. The disclosed embodiments prevent such access.

In these embodiments, identification card 250 is read by contactless input device 1061 and card data 504 is captured. Further, MFP 106 or contactless input device 1061 generates transaction information 506 for the transaction at MFP 106. Transaction information 506 may be information specific to the action being performed on MFP 106. Transaction information 506 may include detailed information of the transaction being performed, such as the date or time of the log on, location of MFP 106, device information for MFP 106, card number 501, user name 252, the action being taken at MFP 106 (print, scan, fax, and the like), security level of the action being taken, any policies 124 applicable to the action being taken, and the like. Transaction information 506 is included with card data 504 within primary notification 502 send to cloud-based server 102 from MFP 106.

Cloud-based server 102 receives primary notification 502 and determines that administrator 130 needs to approve the registration of identification card 250. Thus, an alert 508 is sent to administrator 130 enclosing primary notification 502 to approve the registration before identification card 250 may be used. Alert 508 includes a format that allows administrator 130 to respond back to accept or disapprove the registration request. Examples of alert 508 may be shown in FIGS. 6A-C.

Figure 6A:
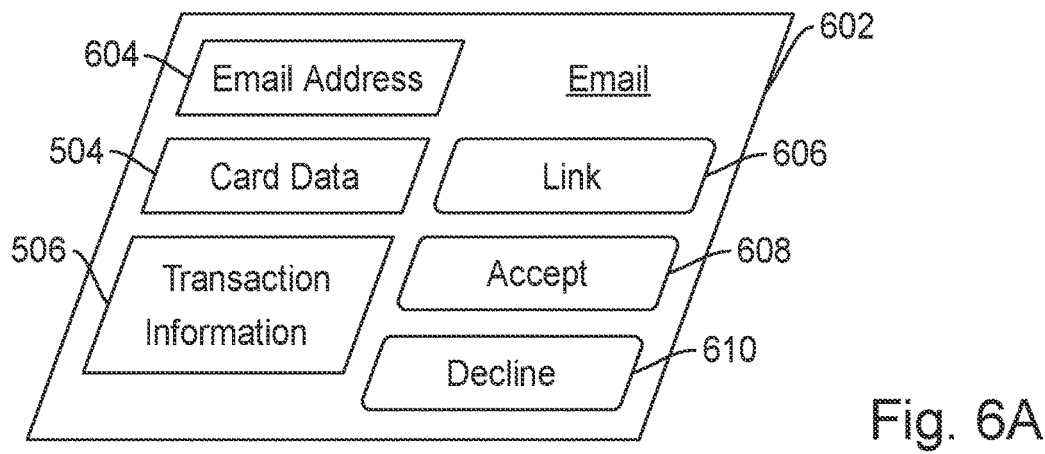
FIG. 6A illustrates an example alert to the administrator using an email to approve or decline the identification card according to the disclosed embodiments.

FIG. 6A depicts an example alert 508 to administrator 130 using an email 602 according to the disclosed embodiments. Email 602 may be sent to an account for administrator 130, as shown by email address 604. Email 602 includes card data 504 and transaction information 506 provided by primary notification 502 so that administrator 130 may review the request in detail before approving or declining to register identification card 250. A link 606 is provided for administrator 130 to click. Link 606 may access a web-based platform from cloud-based server 102 to allow administrator 130 to select an action to be taken.

Alternatively, accept button 608 and decline button 610 may be included in email 602. Buttons 608 and 610 also may launch a webpage for administrator 130 to confirm the selection. Alternatively, buttons 608 and 610 may open a reply email with the selection embedded within. These features allow administrator 130 to send back response 510, as shown in FIG. 5, to cloud-based server 102 on whether identification card 250 is accepted to be registered or not.

Figure 6B:
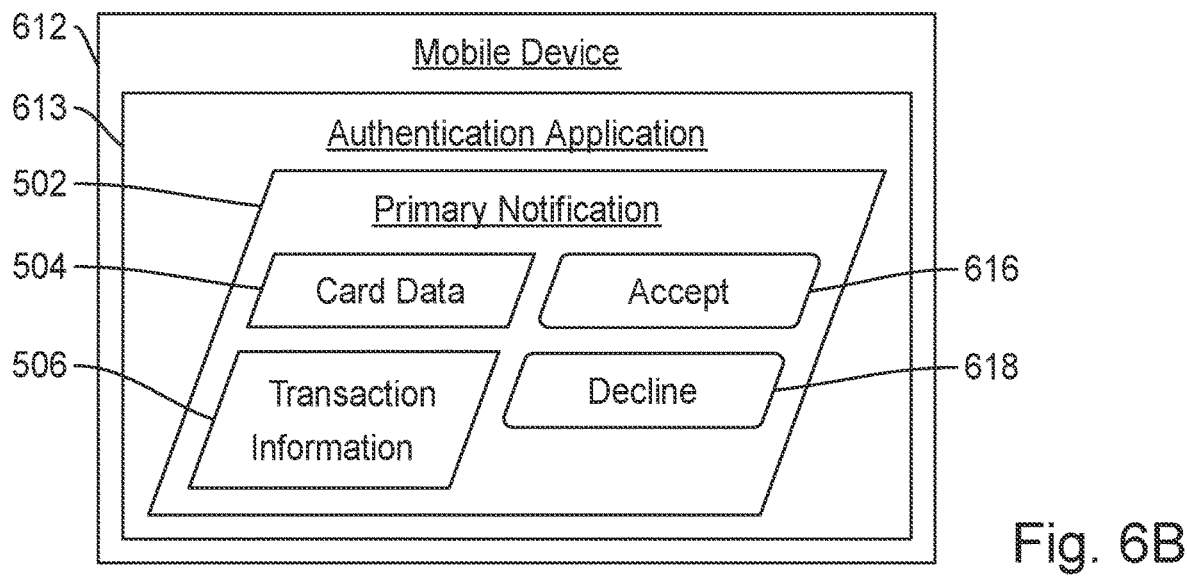
FIG. 6B illustrates a mobile application for use by the administrator 130 to approve or decline the identification card according to the disclosed embodiments.

FIG. 6B depicts an authentication application 613 for mobile use by administrator 130 to approve or decline identification card 250 according to the disclosed embodiments. Administrator 130 may have mobile device 612 that executes an authentication application 613 as a mobile application to approve or decline identification card registrations. Cloud-based server 102 sends alert 508 to application 613, which includes a page to list notifications for administrator 130 to approve. This feature allows alerts 508 to be reviewed and resolved at one time and in a more efficient manner than using email 602.

Notifications are listed within application 613 for administrator 130 to review. Thus, primary notification 502 is displayed on mobile device 612, and includes card data 504 along with transaction information 506. Administrator 130 reviews this information and takes an action using accept button 616 or decline button 618. Buttons 616 and 618 are displayed within application 613 and may be displayed within notifications, for example, within primary notification 502 is illustrated in FIG. 6B. Application 613 compiles the selections and returns them to cloud-based server 102 as response 510. Use of mobile application 613 may present the information in a compact manner for quick resolution by administrator 130 without the need to generate and send emails.

Figure 6C:
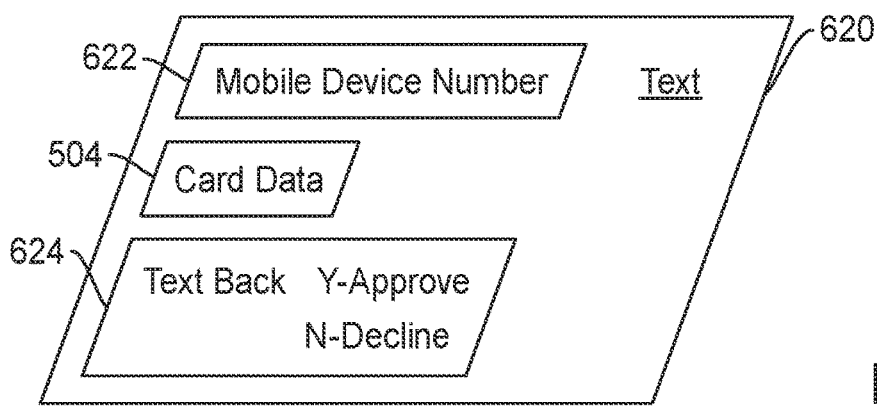
FIG. 6C illustrates an example alert using a SMS text to approve or decline the identification card according to the disclosed embodiments.

FIG. 6C depicts an example alert using a SMS text 620 to approve or decline identification card 250 according to the disclosed embodiments. Text 620 may be a MMS text. Text 620 may be used for immediate approval or decline of the registration of identification card 250. Text 620 also may be received at mobile device 612 from cloud-based server 102. Text 620 may be sent to mobile device number 622 for administrator 130 as opposed to email address 604 or mobile application 613. As alert 508 is a text, the information provided within may be limited to card data 504. In other embodiments, text 620 may include primary notification 502 also with transaction information 506. Text 620 also includes text 624 that instructs administrator 130 to respond back to the text with a command to approve or decline the registration of identification card 250. For example, text 624 may instruct administrator 130 to respond back using a "Y" to approve the card or a "N" to decline. Response 510 is one of these commands.

Returning back to FIG. 5, response 510 is received by cloud-based server 102 from administrator 130. Cloud-based server 102 may then take action in accordance with response 510. If identification card 250 is approved, then a notice 516 may be sent to MFP 106 that the card is approved. Further, cloud-based server 102 may send notice 516 that identification card 250 is declined and for the user to present the card to administrator 130 to resolve any issues.

While the approval process disclosed above is being performed, identification card 250 may be used in a subsequent transaction. The disclosed embodiments account for the status of identification card 250 to tell the reporting device what to do. There may be some lag in administrator 130 approving or declining in response to alert 508. Further, unauthorized activity may occur if identification card 250 is misplaced or stolen.

Thus, identification card 250 may be used at a second device, as shown in FIG. 5. Alternatively, it may be used a second time at MFP 106 for a second transaction. FIG. 5, however, shows identification card 250 being used at a second device, such as printing device 112. Identification card 250 is read by contactless input device 112I. Contactless input device 112I, acting as an identification card reader, captures card data 504 and generated transaction information 514 for this transaction. Card data 504 and transaction information 514 are included in secondary notification 512 that is sent to cloud-based server 102 from printing device 112.

Transaction information 514 differs from transaction information 506 as it relates to a separate transaction within system 100. It should be noted that if the second transaction is being done on MFP 106, then MFP 106 would generate transaction information 514.

Cloud-based server 102 may respond to secondary notification 512 by sending notice 516 that identification card 250 is pending approval. The second transaction may be cancelled or placed on hold. This notice allows the user to contact administrator 130 to resolve the registration status of identification card 250. Printing device 112 may display notice 516 to the user.

In some instances, policies 124 may be consulted to determine whether identification card 250 assigned to the user may be used on a limited basis until registration is approved. For example, a policy 124 may allow the user to scan a document but not print a document until identification card 250 is registered by administrator 130. Policy 124 also may allow limited access to documents at cloud-based server 102. This intermediate status may be changed once response 510 is received at cloud-based server 102 from administrator 130.

Further, if additional subsequent transactions are attempted, then cloud-based server 102 may cancel the registration of identification card 250. Identification card 250 may be placed on a banned or unapproved list so that it cannot be used in system 100. Again, policies 124 may be used to determine the number of attempts are allowed before registration is cancelled. This feature prevents unauthorized access from someone that obtain identification card 250 fraudulently.

Further, if identification card 250 is not registered after a certain amount of attempts, then cloud-based server 102 may restrict use of the card or placed it on the banned or disapproved list of cards. Identification card 250 will not be registered until surrendered to administrator 130 for resolution. Cloud-based server 102 may send instructions to devices within system 100 to deny access to identification card 250.

FIG. 7 depicts a flowchart 700 for remote registration of identification card 250 according to the disclosed embodiments. Flowchart 700 may refer to FIGS. 1-6C for illustrative purposes. Flowchart 700, however, is not limited to the embodiments disclosed by FIGS. 1-6C.

Step 702 executes by scanning identification card 250 at an identification card reader, such as contactless input device 1061 of MFP 106. The user may slide identification card 250 through the card reader, or insert the identification card into a slot to be read. Alternatively, identification card 250 may be placed proximate to contactless input device 1061 so that its data is captured. Step 704 executes by capturing card data 504 from identification card 250. Card data 504 may uniquely identify identification card 250 within system 100.

Step 706 executes by generating transaction information 506 for the transaction being performed on the device. Examples of transaction information 506 are disclosed above. Transaction information 506 may be different than card data 504 in that each transaction will result in different transaction information being generated. Step 708 executes by generating primary notification 502 having card data 504 and transaction information 506. Primary notification 502 may be the notification generated for the first use of identification card 250 within system 100.

Step 710 executes by receiving primary notification 502 at cloud-based server 102. Cloud-based server 102 may check a list or file of approved identification cards to see if identification card 250 is already registered based on card data 504. If it is registered, then no further action needs to be taken and the user may proceed with performing operations within system 100, such as accessing, printing, scanning, and managing documents on the cloud-based platform using server 102. If the card is not registered, then flowchart 700 proceeds to step 712.

Step 712 executes by generating alert 508 at cloud-based server 102. Alert 508 may include information from primary notification 502. Step 714 executes by sending alert 508 to administrator 130. The different formats for alert 508 are disclosed above. Alert 508 will prompt administrator to approve or decline registration of identification card 250. This feature allows for greater security in registering identification cards to access network 104 and cloud-based server 102. Policies 124 may set forth certain actions that require administrator approval for identification cards so that unauthorized access is not granted.

Step 716 executes by receiving response 510 at cloud-based server 502 from administrator 130. Administrator 130 approves or declines the request to register identification card from alert 508. For example, administrator may press approve button 616 or decline button 618 in application 613 to generate response 510 back to cloud-based server 102. Cloud-based server 102 receives response 510 and takes the appropriate action.

Step 718 executes by determining whether response 510 approves the registration of identification card 250. If yes, then step 720 executes by registering identification card at cloud-based server 102 so that the user may use the card within system 100. The user may scan identification card 250 at other devices, such as printing device 112 and scanning device 114 in addition to MFP 106. If step 718 is no, then step 722 executes by sending a notice to MFP 106 that registration is declined and that the user should present identification card 250 to administrator 130 for resolution. Step 724 executes by placing identification card 250 in a banned card list so that it cannot be used within system 100. Identification card 250 may be removed from the banned list upon instruction from administrator 130.

Figure 8:
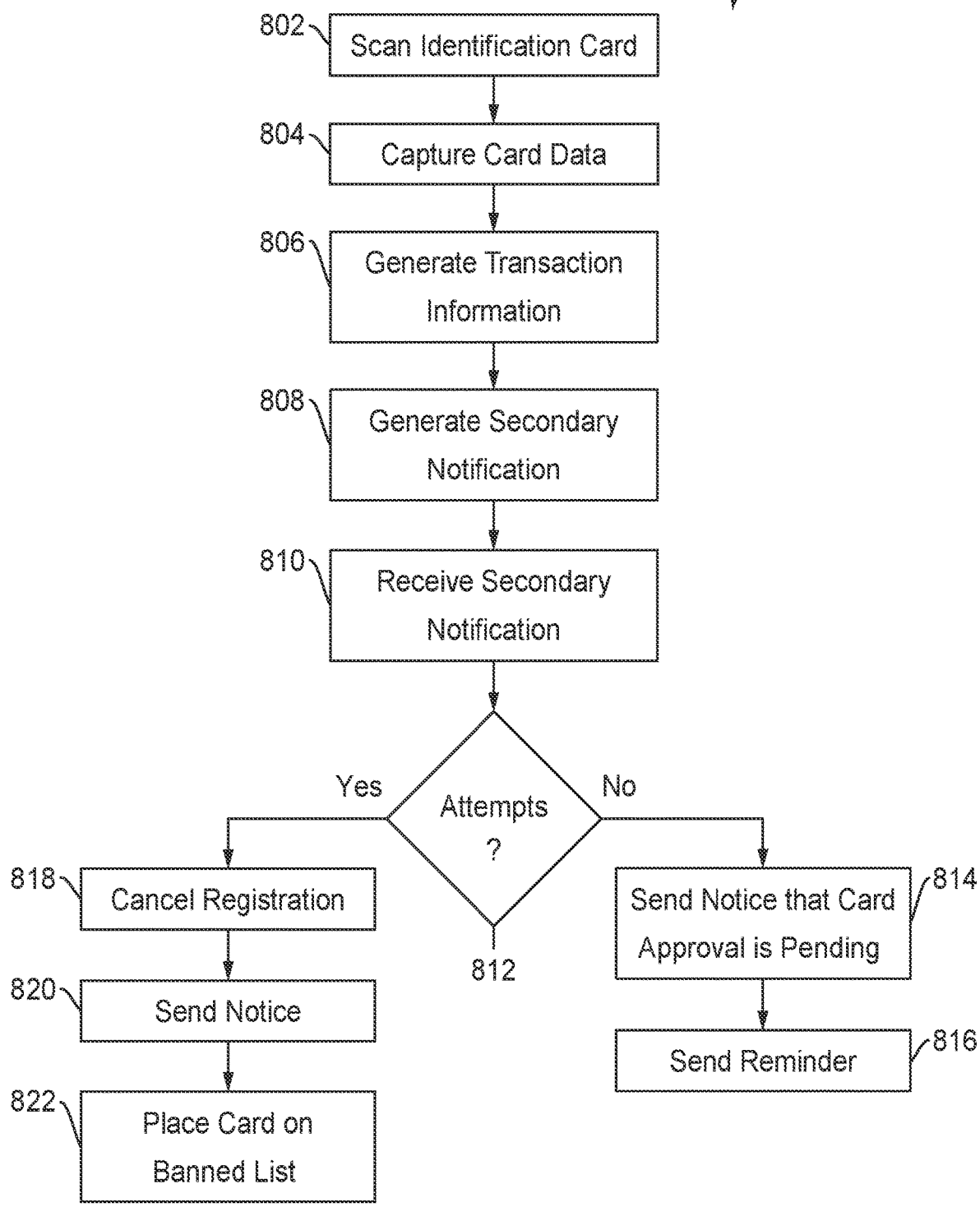
FIG. 8 illustrates a flowchart for processing a second transaction for the identification card while pending approval according to the disclosed embodiments.

FIG. 8 depicts a flowchart 800 for processing a second transaction for identification card 250 while pending approval according to the disclosed embodiments. Flowchart 800 may refer to FIGS. 1-7 for illustrative purposes. Flowchart 800, however, is not limited by the embodiments disclosed by FIGS. 1-7.

Step 802 executes by scanning identification card 250 a second time within system 100. For example, identification card 250 may be scanned at a second device within system 100 or at the same device a second time. Referring to FIG. 5, the user may scan identification card 250 at printing device 112 using contactless input device 112I after initially attempting to register the card at MFP 106. Step 804 executes by capturing card data 504.

Step 806 executes by generating transaction information 514 for the second transaction. As disclosed above, transaction information 514 is different from transaction information 506. Step 808 executes by generating secondary notification 512, which includes card data 504 and transaction information 514. Step 810 executes by receiving secondary notification 512 at cloud-based server 102. Cloud-based server 102 uses card data 504 to determine that identification card 250 is not yet registered but is pending approval from administrator 130. Thus, further action should be taken before resolving how to treat the second transaction.

Step 812 executes by determining whether a specified number of attempts to use or register identification card 250 has been reached. A threshold may be set by policies 124 of the number of times registration or uses may be attempted before further action is taken. For example, after 10 attempts, cloud-based server 102 may take action to prevent more attempts until the issue of registration is resolved. Although the disclosed embodiments show secondary notification 512, it actually may be the $10^{th}$ or more notification received by cloud-based server 102. Cloud-based server 102 tracks the number of attempts based on card data 504 for identification card 250.

If step 812 is no, then step 814 executes by sending notice 516 to the associated device that identification card approval is still pending. Referring to FIG. 5, notice 516 may be send to printing device 112. Printing device 112 then may decline to perform the requested transaction for the user of identification card 250. In other embodiments, policies 124 may allow some actions to be taken, such as making a copy of a document. Access to cloud-based server 102, however, may not be allowed. Step 816 executes by sending a reminder of alert 508 to administrator 130 to approve or decline registration of identification card 250.

If step 812 is yes, then the maximum number of attempts is reached and corrective action needs to be taken. Step 818 executes by cancelling registration of identification card 250. Cloud-based server 102 determines that the registration process will not proceed any further absent instruction from administrator 130. Step 820 executes by sending notice 516 to printing device 112 as well as administrator 130 that the registration is cancelled. Notice 516 may instruct the user to present identification card 250 to administrator 130 for further action or resolution. Step 822 executes by placing identification card 250 on a banned list at cloud-based server, as disclosed above in step 724.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for remote registration of an identification card for use within a cloud-based network, the method comprising:
   receiving a notification at a cloud-based server that an identification card reader at a first device received data from an identification card during a first transaction, wherein the identification card is not registered within the network;
   sending an alert to an administrator within the network to register the identification card, wherein the alert includes a means to approve or disapprove registration of the identification card as well as information regarding the first transaction;
   detecting that the data from the identification card is submitted for a second transaction at a second device within the network, wherein the identification card is not registered as approved at the cloud-based server;
   generating a notice that the identification card is not registered as approved at the cloud-based server; and
   sending the notice to the second device that the second transaction is not allowed.

2. The method of claim 1, further comprising determining that the identification card is used a specified number of times.

3. The method of claim 2, further comprising logging that the identification card is not allowed for each of the specified number of times.

4. The method of claim 3, further comprising cancelling registration of the identification card.

5. The method of claim 4, further comprising placing the identification card on a banned card list at the cloud-based server, wherein the identification card cannot be used for additional transactions within the network.

6. The method of claim 4, further comprising sending a cancelled registration alert to the administrator.

7. The method of claim 1, wherein the alert includes an email having a link to approve or disapprove registration of the identification card.

8. The method of claim 1, wherein the alert includes a message for an application to register identification cards within the network.

9. The method of claim 1, wherein the alert includes a text message to a mobile device.

10. A method for remote registration of an identification card for use within a cloud-based network, the method comprising:
    receiving a notification at a cloud-based server that an identification card reader at a device received data from an identification card during a first transaction, wherein the identification card is not registered within the network;
    sending an alert to an administrator within the network to register the identification card, wherein the alert includes a means to approve or disapprove registration of the identification card as well as information regarding the first transaction;
    detecting that the data from the identification card is submitted for a second transaction at the device within the network, wherein the identification card is not registered as approved at the cloud-based server;
    generating a notice that the identification card is not registered as approved at the cloud-based server; and
    sending the notice to the device that the second transaction is not allowed.

11. The method of claim 10, further comprising determining that the identification card is used a specified number of times.

12. The method of claim 11, further comprising logging that the identification card is not allowed for each of the specified number of times.

13. The method of claim 12, further comprising cancelling registration of the identification card.

14. The method of claim 13, further comprising placing the identification card on a banned card list at the cloud-based server, wherein the identification card cannot be used for additional transactions within the network.

15. The method of claim 13, further comprising sending a cancelled registration alert to the administrator.

16. An identification card registration system comprising:
    a cloud-based server; and
    a plurality of devices connected to the cloud-based server over a network, wherein each of the plurality of devices includes an identification card reader,
    wherein the cloud-based server is configured to
    receive a notification at the cloud-based server that an identification card reader at a device of the plurality of devices received data from an identification card during a first transaction, wherein the identification card is not registered within the network;

send an alert to an administrator within the network to register the identification card, wherein the alert includes a means to approve or disapprove registration of the identification card as well as information regarding the first transaction;

detect that the data from the identification card is submitted for a second transaction within the network, wherein the identification card is not registered as approved at the cloud-based server;

generate a notice that the identification card is not registered as approved at the cloud-based server; and send the notice from the cloud-based server that the second transaction is not allowed.

17. The identification card registration system of claim 16, wherein the cloud-based server further is configured to send the notice to the device.

18. The identification card registration system of claim 16, wherein the cloud-based server further is configured to send the notice to another device of the plurality of devices.

19. The identification card registration system of claim 16, wherein the cloud-based server further is configured to determine that the identification card is used a specified number of times.

20. The identification card registration system of claim 19, wherein the cloud-based server further is configured to log at the cloud-based server that the identification card is not allowed for each of the specified number of times.

\* \* \* \* \*